(12) United States Patent
Jha et al.

(10) Patent No.: US 11,010,950 B1
(45) Date of Patent: May 18, 2021

(54) COMPUTER-BASED METHOD AND SYSTEM FOR DETERMINING GROUNDWATER POTENTIAL ZONES

(71) Applicant: QUANTELA INC, Milpitas, CA (US)

(72) Inventors: Sanjiv Kumar Jha, Bangalore (IN); Vikash Shivhare, Madhya Pradesh (IN); Sumedh Ghatage, Kolhapur (IN); Shubham Agarwal, Uttar Pradesh (IN)

(73) Assignee: Quantela Inc., Milpitas, CA (US)

( * ) Notice: Subject to any disclaimer, the term of this patent is extended or adjusted under 35 U.S.C. 154(b) by 0 days.

(21) Appl. No.: 16/735,430

(22) Filed: Jan. 6, 2020

(51) Int. Cl.
*G06T 11/60* (2006.01)
*G06T 7/40* (2017.01)
*G06T 7/55* (2017.01)

(52) U.S. Cl.
CPC ............... *G06T 11/60* (2013.01); *G06T 7/40* (2013.01); *G06T 7/55* (2017.01); *G06T 2207/10036* (2013.01); *G06T 2207/30188* (2013.01)

(58) Field of Classification Search
CPC ... G06T 11/60; G06T 7/55; G06T 7/40; G06T 2207/30188; G06T 2207/10036
See application file for complete search history.

(56) References Cited

FOREIGN PATENT DOCUMENTS

| IN | 201841018465 A | * | 11/2019 |
| KR | 101703972 B1 | * | 2/2017 |

* cited by examiner

*Primary Examiner* — Jeffery A Brier
(74) *Attorney, Agent, or Firm* — Shook, Hardy & Bacon, L.L.P.

(57) ABSTRACT

Computer-based method and system for geo-spatial analysis for determining groundwater potential zones within a geographic area are disclosed herein. The method and system facilitate a user, without any hard knowledge of geographic information system (GIS) to perform quick geo-spatial analysis with a fully automated, single step, and single input process including automatically retrieving a set of satellite images and digital elevation model (DEM) corresponding to a geographic area and a time frame provided by the user, automatically processing the set of satellite images and DEM to determine one or more spectral indices and topographic wetness index (TWI) corresponding to the geographic area and time frame, automatically determining the groundwater potential zones using the one or more spectral indices and the TWI and automatically presenting a visualization depicting the groundwater potential zones within the geographic area.

21 Claims, 10 Drawing Sheets

COMPUTER-BASED METHOD AND SYSTEM FOR DETERMINING GROUNDWATER POTENTIAL ZONES

FIELD OF THE INVENTION

Embodiments described herein in general, concern computer-based method and system for geo-spatial analysis. More particularly, the embodiments concern to a fully automated geospatial artificial intelligence (Geo-AI) based method and system for determining and presenting quantitative analysis of groundwater potential zones within a geographic area.

CROSS-REFERENCES

Various methods, systems, apparatus, and technical details relating to the present invention are disclosed in the following co-pending applications filed by the applicant or assignee of the present invention. The disclosures of all of these co-pending/granted applications are incorporated herein by cross-reference.
Co-pending application titled "COMPUTER-BASED METHOD AND SYSTEM FOR GEO-SPATIAL ANALYSIS."
Co-pending application titled "COMPUTER-BASED METHOD AND SYSTEM FOR URBAN PLANNING."
Co-pending application titled "COMPUTER-BASED METHOD AND SYSTEM FOR PREDICTING AND GENERATING LAND USE LAND COVER (LULC) CLASSIFICATION."

BACKGROUND OF THE INVENTION

Unless otherwise indicated herein, the approaches described in this section are not prior art to the claims in this application and are not admitted to be prior art by inclusion in this section.

Urban parameters are required in various applications of urban planning and management. Urban parameters allow for diagnosis of problems and pressure on cities, and help in identification of areas that would profit from being addressed through good governance and science-based responses allowing cities to monitor and manage the resources and success and impact of sustainability interventions. One of the Urban parameter is ground water potential zones. Nowadays, Geospatial Technology and Earth Observation System play a vital role in determining the groundwater potential zones within a geographic area for efficient planning and development.

The data provided by the earth observation system usually includes large sized satellite image files and is often provided in a format which requires more resources to store and process than necessary.

Also, the conventional computer-based systems for determining the groundwater potential zones are not fully automatic and a user must have good knowledge of geographic information system (GIS) for operating the conventional computer-based systems.

Hence, it is apparent that a need exists for a Geo-spatial artificial intelligence (Geo-AI) based fully automated computer-based method and system for efficient data acquisition and processing for determining and presenting the groundwater potential zones within the geographic area which empowers the user with enhanced visibility into data and where the user does not require any priori knowledge of the geographic information system (GIS) for operating the computer-based system.

SUMMARY OF THE INVENTION

According to an embodiment, a computer-implemented method for determining groundwater potential zones within a geographic area is described. The computer-implemented method comprises receiving an input defining a geographic area and a time frame. The computer-implemented method further comprises automatically retrieving a set of satellite images corresponding to the geographic area and the time frame, automatically retrieving Digital Elevation Model (DEM) corresponding to the geographic area and the time frame. The computer-implemented method further comprises automatically processing the set of satellite images to compute one or more spectral indices corresponding to the geographic area and the time frame. The computer-implemented method further comprises automatically processing the Digital Elevation Model (DEM) to compute a topographic wetness index (TWI) corresponding to the geographic area and the time frame. The computer-implemented method further comprises automatically computing groundwater potential zones using the one or more spectral indices and the TWI, and automatically presenting a visualization depicting the groundwater potential zones within the geographic area for the time frame.

According to an example, automatically retrieving a set of satellite images may include automatically selecting and retrieving satellite images with at most 5 percent cloud coverage from one or more servers. According to an example, automatically retrieving a set of satellite images may include automatically retrieving level-1 precision and terrain (L1TP) corrected satellite images from one or more servers.

According to an example, automatically processing the satellite images to compute one or more spectral indices may include automatically converting digital numbers of each pixel of one or more spectral band images, corresponding to the set of satellite images, into reflectance values of the respective spectral bands using radiometric calibration, and automatically computing one or more spectral indices for each pixel of the set of satellite images using the corresponding reflectance values.

According to an example, automatically retrieving a set of satellite images may include automatically retrieving said one or more spectral bands or images corresponding to the one or more spectral indices.

According to an example, automatically processing the satellite images to compute one or more spectral indices may include automatically fetching said one or more spectral band images, corresponding to the one or more spectral indices, from the set of satellite images.

According to an example, the one or more spectral indices may include at least one of normalized difference vegetation index (NDVI), modified normalized difference water index (MNDWI), normalized difference built up index (NDBI), and normalized difference moisture index (NDMI).

According to an example, automatically processing the Digital Elevation Model (DEM) to compute a topographic wetness index (TWI) may include automatically computing slope, using the DEM, corresponding to the geographic area and the time frame, and automatically computing TWI using the slope corresponding to the geographic area and the time frame.

According to an example, automatically computing the groundwater potential zones using the one or more spectral indices and the TWI may include automatically computing and assigning weights to each of the one or more spectral indices and the TWI, and automatically determining a groundwater potential index for each pixel of the set of satellite images using the weighted one or more spectral indices and the TWI via weighted sum approach. The computer-implemented method may further comprise automatically comparing the groundwater potential index for each pixel of the set of satellite images with pre-defined thresholds, and automatically classifying each pixel of the set of satellite images, into zones including no GWP zone, poor GWP zone, moderate GWP zone, or high potential GWP zone, based on the comparison.

According to an example, automatically presenting a visualization depicting the groundwater potential zones may include automatically presenting the classified pixels, and respective zones, on an image of the geographic area.

According to an example, the computer-implemented method may further comprise automatically calculating a quantitative value of an area covered by pixels of each zone.

According to an example, automatically presenting a visualization depicting the groundwater potential zones may include automatically presenting the area covered by the pixels of each zone on an image of the geographic area.

According to another exemplary embodiment, a system for for determining groundwater potential zones within a geographic area is described. The system comprises at least one processor and at least one computer readable memory coupled to the at least one processor, and the processor is configured to perform all or some steps of the method described above.

According to another exemplary embodiment, a non-transitory computer readable medium is described. The non-transitory computer readable medium comprises a computer-readable code comprising instructions, which when executed by a processor, causes the processor to perform all or some steps of the method described above.

It is an object of the invention to provide a fully automated computer based method and system therefor for data acquisition and quantitative assessment of the groundwater potential zones within a geographic area where a user does not require any hard knowledge of the geographic information system (GIS) for operating the computer-based system or method. The object is to provide a fully automated computer based method and a system therefor to enable a user to perform Geo-spatial analysis with minimum input (for example, only the ones related to geographic area and the time frame for which analysis is to be performed) and arriving directly at the quantitative assessment of the groundwater potential zones within the geographic area, and that too without the need for the user to have any hard knowledge of the GIS.

It is an object of the invention to link data science with geo-spatial domain knowledge to enable a user with no hard knowledge of GIS to perform the analysis with a single step process.

It is an object of the invention to provide a single input/step process to run the computer-based system or method to arrive at the quantitative analysis of the groundwater potential zones within the geographic area.

It is an object of the invention to automatically provide quantitative statistical measurements of the groundwater potential zones with better visualization depicting the potential zones for groundwater within the geographic area within seconds and with a single click. The visualizations facilitate easily interpretable outcomes with granularity.

It is an object of the invention to automatically provide quantitative analysis of groundwater potential zones within the geographic area thereby facilitating mapping and monitoring of urban dynamism by a user with minimal GIS knowledge.

It is an object of the invention to provide time efficiency. It is further an object of the invention to provide readable outputs of the groundwater potential zones in most time and energy efficient manner.

It is an object of the invention to provide reduced memory consumption. The image pre-processing for retrieving the set of images from the one or more servers is performed on the one or more servers. The images do not need to be saved for analytical assessments while selecting the spectral bands. The process incurred in the analytics is on cloud.

The summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

GENERAL DESCRIPTION OF THE INVENTION

Figure 1:
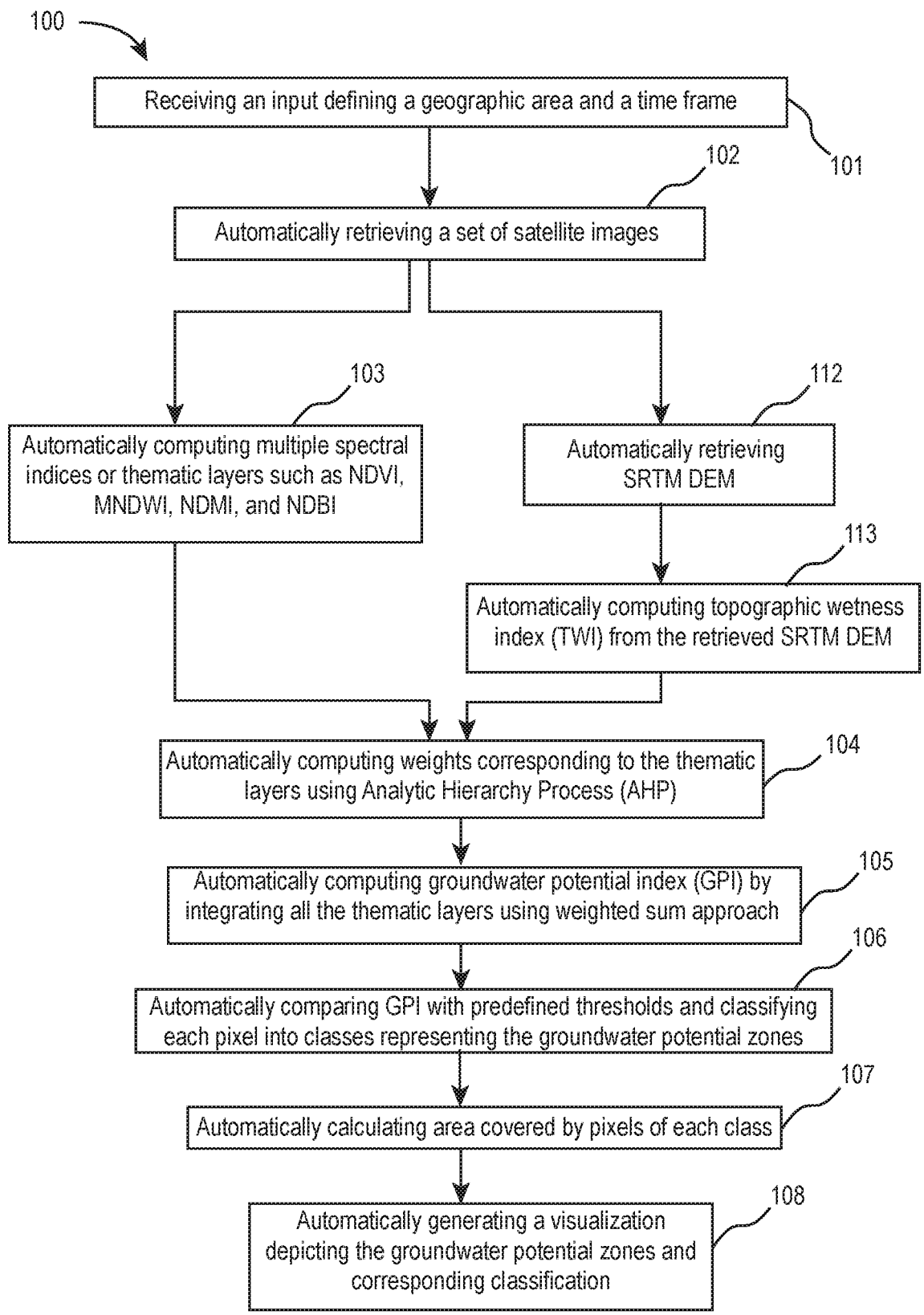
FIG. 1 schematically shows an exemplary flow diagram for an automated method for determining and presenting groundwater potential zones within a geographic area.

Embodiments described herein generally concern to a fully automated computer-based system and method for geo-spatial analysis for determining and presenting the groundwater potential zones within the geographic area.

Geospatial Technology and Earth Observation (EO) satellite play a vital role in determining the groundwater potential zones within the geographic area.

For the purposes of the present description, the Landsat satellite images and Shuttle Radar Topography Mission (SRTM) Digital Elevation Model (DEM) have been used for the purposes of the described methods and systems. However, such usage of specific satellite images and DEM may not be considered as, in any way, limiting the scope of the present description. Any other satellite mission data or DEM, as would be known to a person having ordinary skill in the art, may be considered within the spirit and scope of the present description.

The Landsat 8 satellite payload consists of two science instruments—the Operational Land Imager (OLI) and the Thermal Infrared Sensor (TIRS). These two sensors provide seasonal coverage of the global landmass at a spatial resolution of 30 meters for coastal, visible (visible blue, visible green and visible red band), near infrared (NIR), and short wave infrared spectral bands (SWIR-1 and SWIR-2); 100 meters for thermal infrared (TIR) spectral bands; and 15 meters for panchromatic band. The image acquired by lands at 8 is a multi-spectral image consisting of 11 spectral bands.

The Landsat 8 satellite acquires high-quality, well-calibrated multispectral data over the Earth's land surfaces. On average, over 650 unique images are acquired per day across the globe and sent to the USGS (United States Geological Survey) EROS (Earth Resources Observation and Science) Center for storage, archive, and processing. All of these images are processed to a standard Level-1 product.

Landsat scenes with the highest available data quality are placed into Tier 1 and are considered suitable for time-series analysis. Tier 1 includes Level-1 Precision and Terrain (L1TP) corrected data that have well-characterized radiometry and are inter-calibrated across the different Landsat instruments. The level-1 product data is radiometrically calibrated and orthorectified using ground control points (GCPs) and digital elevation model (DEM) data to correct for relief displacement. The highest quality Level-1 products are suitable for pixel-level time series analysis.

A complete standard Level-1 product consists of 13 files, including the 11 spectral band (OLI Bands 1-9 and TIR Bands 10 & 11) images, product-specific metadata file, and a Quality Assessment (QA) image. The image files are all 16-bit GeoTIFF images (a standard, public-domain image format based on Adobe's TIFF), which is a self-describing format developed to exchange raster images.

In addition to GeoTIFF, the data incorporate cubic convolution resampling, North Up (Map) image orientation, and Universal Transverse Mercator (UTM) map projection (Polar Stereographic projection for scenes with a center latitude greater than or equal to −63.0 degrees) using the WGS84 datum. The format of the final output product is a tar.gz file. The images are stored as tiled Geotiffs.

Google Earth Engine and the Amazon-NASA Earth Exchange (NEX) stores historical Landsat data in a cloud based storage.

DETAILED DESCRIPTION OF THE INVENTION

Embodiments of the present invention are best understood by reference to the figures and description set forth herein. All the aspects of the embodiments described herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit and scope thereof, and the embodiments herein include all such modifications.

This description is generally drawn, inter alia, to methods, apparatuses, systems, devices, non-transitory mediums, and computer program products implemented as automated tools for geospatial analysis for determining and presenting quantitative analysis of the groundwater potential zones within a geographic area.

Multiple thematic layers like normalized difference vegetation index (NDVI), modified normalized difference water index (MNDWI), normalized difference built up index (NDBI), normalized difference moisture index (NDMI), and topographical maps are considered for determining the groundwater potential zones within a geographic area. The thematic layers are automatically computed using the Landsat-8 satellite data and the DEM to determine groundwater potential zones within a geographic area.

FIG. 1 schematically shows an exemplary flow diagram for an automated method for determining and presenting the groundwater potential zones within a geographic area, in accordance with at least some embodiments described herein.

At step 101, an input defining a geographic area and a time frame is received from a user, the input intends towards analysis of groundwater potential zones within the defined geographic area for the defined time frame. In some examples, the input defining a geographic area may include but not limited to, an extent of a city, a city name, a latitude and/or longitude or any other geographic coordinates of an area.

In some examples, the time frame may include but not limited to, a calendar year, a calendar date or a month. In some examples, the time frame may include a date range where the user provides a start date and an end date.

One skilled in the art will appreciate that two inputs with regard to geographic area and time frame has been described for the purpose of illustrations and not limitation. Any number of inputs with regard to geographic area and time frame throughout the methods described herein shall be considered within the spirit and scope of the present description.

Image Acquisition

At step 102, a set of satellite images corresponding to the defined geographic area and the time frame are automatically selected and retrieved from one or more servers. In some examples, landsat-8 satellite images are retrieved from the one or more servers. In some examples, the one or more servers may include but not limited to, Google Cloud Storage, Amazon AWS S3 or USGS EROS (Earth Resources Observation and Science) database, remote database, or a local database.

In some examples, the latitude and/or longitude values of the defined geographic area are converted into pixel locations. In some examples, the satellite images are stored in tiled form on the one or more servers. The satellite images are divided into multiple tiles in UTM/WGS84 projection. Each tile has its own projection information which is used for conversion of a spherical surface to a square tile and vice versa. In some examples, a separate list of all the projection information of all the tiles is automatically created that is used for converting the latitude and/or longitude values into pixel locations.

In some examples, the tile containing the defined geographic area corresponding to the defined time frame is automatically selected and retrieved from the one or more servers. In some examples, the defined geographic area lie around tile edges and fall on multiple tiles. In such a scenario, the best tile is selected and retrieved from the one or more servers to maintain the uniformity. In some examples, the multiple tiles containing the defined geographic area are merged together and the merged tiles are retrieved from the one or more servers for further processing.

In some examples, a set of satellite images corresponding to the defined geographic area and the time frame are automatically selected and bounding box containing the defined geographic area within the satellite images is automatically computed. The image is cropped around the edges of the bounding box and the cropped image is automatically retrieved from the one or more servers.

In some examples, the bounding box falling under the UTM zones corresponding to the defined geographic area are automatically selected and corresponding tiles are automatically retrieved from the one or more servers.

In some examples, the size of the tiles of the satellite images is very large usually in megabytes (MB). In such a scenario, the raster data of the satellite images is optimized by converting the raster data into a format that is handled by using standard Python libraries.

In some examples, the landsat level-1 product data corresponding to the defined geographic area and the time frame are automatically retrieved from the one or more servers. In some examples, geometrically corrected satellite images corresponding to the defined geographic area and time frame are automatically retrieved from the one or more servers. In some examples, the landsat level-1 Precision and Terrain (L1TP) corrected product data corresponding to the defined geographic area and the time frame are automatically retrieved from the one or more servers. The level-1 Precision and Terrain (L1TP) corrected product data is radiometrically calibrated and orthorectified using ground control points (GCPs) and digital elevation model (DEM) data to correct for relief displacement. The highest quality landsat level-1 products are suitable for pixel-level time series analysis.

In some examples, the satellite images having less cloud coverage are automatically selected and retrieved from the one or more servers. Cloud cover may obscure the ground underneath it and affects the satellite images which hampers the analysis results. In some examples cloud cover may include but not limited to clouds, atmospheric obstructions, such as smoke, snow, haze, or smog, or combinations thereof. In some examples, cloud based filters are used to automatically select those satellite images which have less cloud coverage. In some examples, only those satellite images which have less cloud coverage are automatically selected and retrieved from the one or more servers. In some examples, best satellite images with at most 5 percent cloud coverage corresponding to the defined geographic area and the time frame are automatically selected and retrieved from the one or more servers. In some examples, best satellite images with at most 7 percent, at most 10 percent, at most 15 percent, at most 20 percent, at most 25 percent, at most 30 percent, at most 35, or at most 40 percent cloud coverage corresponding to the defined geographic area and the time frame are automatically selected and retrieved from the one or more servers.

In some examples, cloud free satellite images are automatically selected and retrieved from the one or more servers.

In some examples, the one or more spectral bands or spectral band images corresponding to the defined geographic area, that are required for computing the spectral indices corresponding to the urban parameters, are automatically selected and retrieved from the one or more servers. In some examples, only those spectral bands of the satellite images corresponding to defined geographic area and time frame, that are required for computing the specific spectral indices corresponding to the specific urban parameters to be determined, are automatically selected and retrieved from the one or more servers. In some examples, spectral band specific satellite images corresponding to the defined geographic area and the time frame, that are required for computing the spectral indices corresponding to the urban parameters, are automatically selected and retrieved from the one or more servers.

In some examples, the image pre-processing for retrieving the set of images from the one or more servers is performed on the one or more servers. The images do not need to be saved for analytical assessments while selecting the spectral bands. The process incurred in the analytics is on cloud.

At step 103, one or more spectral indices are automatically computed from the retrieved set of satellite images corresponding to the geographic area and time frame. In some examples, the one or more spectral indices may include at least one of normalized difference vegetation index (NDVI), modified normalized difference water index (MNDWI), normalized difference built up index (NDBI), and normalized difference moisture index (NDMI). In some examples, one or more spectral indices are automatically computed for each pixel of the satellite images. In some examples, multiple thematic layers or thematic maps representing the one or more spectral indices for each pixel of the satellite images corresponding to the geographic area and the time frame are automatically generated.

In some examples, the one or more spectral indices for each pixel of the satellite images are automatically compared with respective pre-defined thresholds. Based on the comparison, each pixel is then automatically classified into one or more classes with respect to each of the spectral index. In some examples, a set of default threshold values are generalized for each spectral index to classify each pixel into one or more classes with respect to each of the spectral index. In some examples, multiple thematic layers or thematic maps representing each of the one or more spectral indices and the corresponding pixel classification corresponding to the geographic area and the time frame are automatically generated.

At step 112, Digital Elevation Model (DEM) corresponding to the defined geographic area and the time frame is automatically retrieved from the one or more servers. In some examples, the one or more servers may include but not limited to, Google Cloud Storage, Amazon AWS S3 or USGS EROS (Earth Resources Observation and Science) database, remote database, or a local database. In some examples, the Digital Elevation Model (DEM) may include Shuttle Radar Topography Mission (SRTM) DEM.

At step 113, the topographic wetness index (TWI) is automatically computed. TWI is derived through interactions of fine-scale landform coupled to the up-gradient contributing land surface area according to the following equation:

TWI=ln [CA/Slope]; where CA is the local upslope catchment area that drains through a grid cell; and Slope is the steepest outward slope for each grid cell measured as drop/distance, i.e., tan of the slope angle.

In some examples, the slope corresponding to the defined geographic area and the time frame is automatically computed from the retrieved DEM. In some examples thematic layers or thematic maps representing the DEM and/or the slope corresponding to the defined geographic area are automatically generated.

At step 104, a weight corresponding to each of the one or more spectral indices and the TWI is automatically computed and assigned to each of the one or more spectral indices and the TWI. In some examples, a weight is automatically computed and assigned to each thematic layer including the NDVI, MNDWI, NDMI, NDBI, and the topographic wetness index. In some examples, the weights corresponding to each of the thematic layer are automatically computed by using Analytic Hierarchy Process(AHP). The Analytic Hierarchy Process (AHP) computes weights corresponding to each of the thematic layer by using pairwise comparison matrix. Each thematic layer is compared with respect to the each other thematic layer and the weight is assigned to each thematic layer based on the comparison and the relevance of each thematic layer with groundwater occurrence. In some examples, a rank is automatically assigned to pixels of each class within each thematic layer according to their relevance with groundwater occurrence.

At step 105, a groundwater potential index for each pixel of the set of satellite images is automatically computed by integrating all the thematic layers via weighted sum approach. In some examples, a groundwater potential index for each pixel of the set of satellite images is automatically computed using the weighted values of the one or more spectral indices and the TWI via weighted sum approach. The groundwater potential index is computed using the following equation:

$$GPI = NDVI_w NDVI_{Ri} + MNDWI_w MNDWI_{Ri} + NDBI_w NDBI_{Ri} + NDMI_w NDMI_{Ri} + TWI_w TWI_{Ri}$$

Where, GPI represents the groundwater potential index, w is the weight corresponding to the thematic layer, Ri is the rank corresponding to the pixel classification within each thematic layer.

At step 106, the groundwater potential index for each pixel of the set of satellite images is automatically compared with pre-defined thresholds. Based on the comparison, each pixel is then automatically classified into classes/zones including but not limited to very poor GWP zones, poor GWP zones, moderate GWP zones, and high potential GWP zones. However, any other form of classification, as may be understood to a person skilled in the art may be used.

At step 107, an area covered by pixels of each zone is automatically calculated. In some examples, percentage of total geographic area covered by pixels of each zone is calculated.

At step 108, a visualization depicting the groundwater potential zones is automatically generated and presented on an image or a map of the geographic area. In some examples, a visualization depicting the classified pixels and the respective zone is automatically generated. In some examples, the classified pixels and the respective zone are presented on an image of the geographic area. In some examples, the classified pixels and the respective zone are presented on a map of the geographic area. In some examples, thematic map or thematic layer representing the classified pixels and the respective zone is automatically generated. In some examples, a visualization depicting the quantitative value of the area and/or the percentage of geographic area covered by pixels of each zone is automatically generated. In some examples, pixel count of each zone is presented on an image or a map of the geographic area. In some examples, the quantitative value of the area and/or the percentage of geographic area covered by pixels of each zone is presented on an image or a map of the geographic area. In some examples, the pixel count, and/or the quantitative value of the area and/or the percentage of geographic area covered by pixels of each zone is presented in a readable output to the user. The readable output may include but not limited to, a text, a message or a tabular form.

Figure 1A:
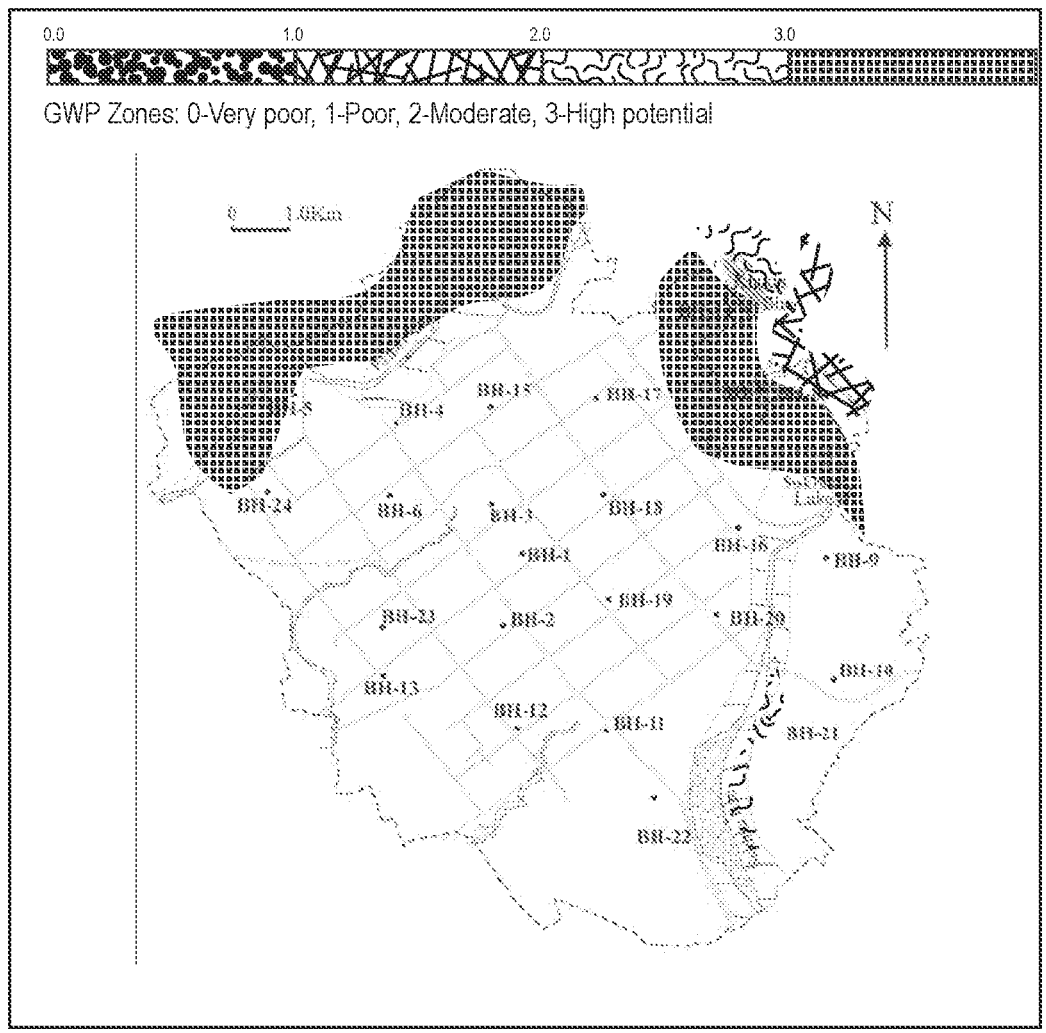
FIG. 1A shows the ground water potential zones on an image of the geographic area.

As an example, FIG. 1A shows the ground water potential zones on an image of the defined geographic area for the defined time frame. The table 10 presents the zones, pixel count of each zone, the area in square km covered by each zone, the percentage of total area covered by each zone.

Figure 2:
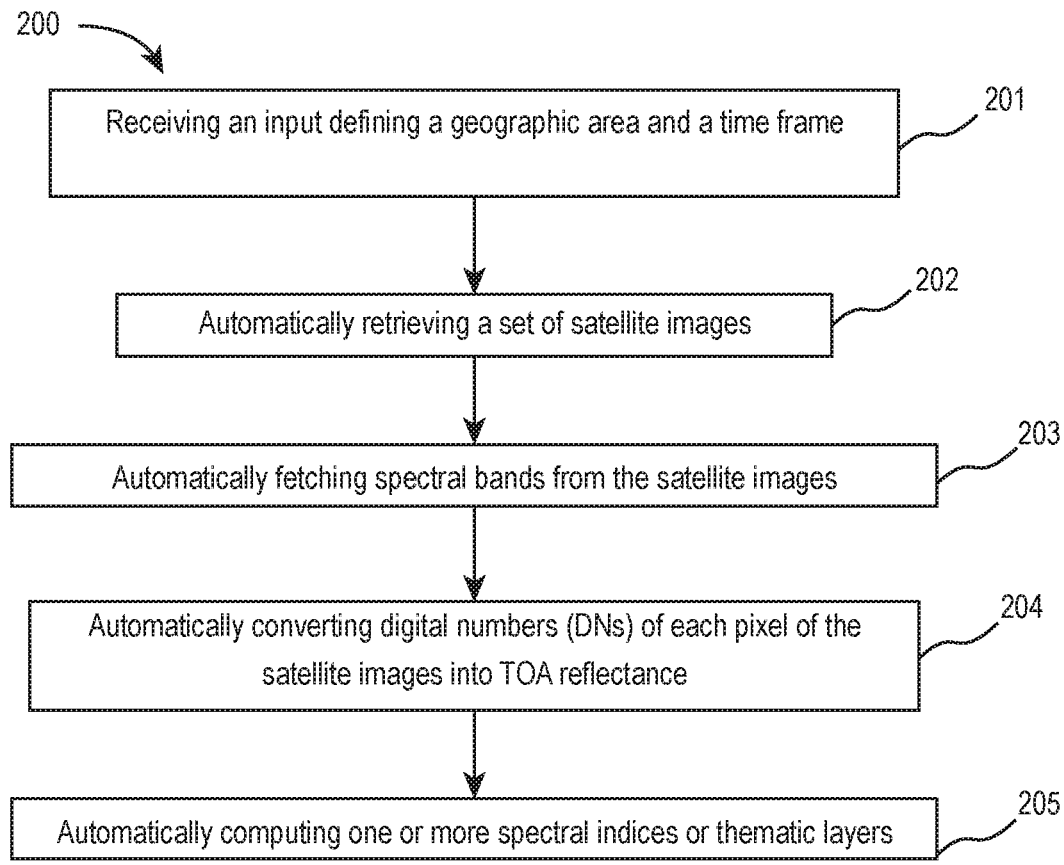
FIG. 2 schematically shows an exemplary flow diagram for an automated method for computing spectral indices.

FIG. 2 schematically shows an exemplary flow diagram 200 for an automated method for computing spectral indices, in accordance with at least some embodiments described herein.

Step 201 for receiving an input defining a geographic area and a time frame, and step 202 for automatically retrieving the satellite images corresponding to the defined geographic area and the time frame from one or more servers are, similar to steps 101 and 102, respectively, of method 100 of FIG. 1.

At step 203, the spectral bands or spectral band images corresponding to the spectral index to be computed are automatically selected and fetched from the retrieved set of satellite images. In some examples, the spectral band specific satellite images that are required for computing the spectral indices are automatically selected and fetched from the retrieved set of satellite images.

Image Processing

At step 204, digital numbers (DN) of each pixel of one or more spectral bands or spectral band images, corresponding to the set of satellite images, are automatically converted into reflectance values of the respective spectral bands. Each landsat satellite image consists of 11 spectral bands. Each pixel intensity in each spectral band of the satellite image is coded using a digital number in specific bit ranges. The raw digital number of each pixel of the satellite image in each spectral band is converted into reflectance value of the respective spectral band. In some examples, the reflectance value includes Top of Atmosphere (ToA) reflectance value. In some examples, radiometric calibration is used to convert the digital numbers of each pixel of the satellite images into reflectance values. The radiometric calibration converts the digital number of each pixel of the satellite image in each spectral band into TOA reflectance value of the respective spectral band using the band-specific calibration coefficients provided in the product-specific metadata file of the level 1 product data of the landsat. The digital numbers of each pixel of the satellite images provided in the Level 1 product data are converted to TOA reflectance values using the following equation:

$$\rho\lambda = (M\rho * Q\text{cal} + A\rho)/\cos(\theta SZ); \text{ where:}$$

$\rho\lambda$=TOA Reflectance;

M $\rho$=Reflectance multiplicative scaling factor for the band (REFLECTANCEW_MULT_BAND_n from the metadata);

A $\rho$=Reflectance additive scaling factor for the band; (REFLECTANCE_ADD_BAND_N from the metadata);

Q cal=Level 1 pixel value in DN;

$\theta$ SE=Local sun elevation angle; the scene center sun elevation angle in degrees is provided in the metadata;

$\theta$ SZ=Local solar zenith angle; $\theta SZ=90°-\theta SE$.

In some examples, the digital numbers (DN) of each pixel of one or more spectral bands or spectral band images, corresponding to the set of satellite images, are automatically converted into radiance values of the respective spectral bands. The raw digital number of each pixel of the satellite image in each spectral band is converted into radiance value of the respective spectral band. The radiometric calibration is used to convert the digital number of each pixel of the satellite image in each spectral band into radiance value of the respective spectral band using the band-specific calibration coefficients provided in the product-specific metadata file of the level 1 product data of the satellite images using the following equation:

$$L\lambda = ML * Q\text{cal} + AL; \text{ where:}$$

$L\lambda$=Spectral radiance (W/(m$^2$*sr*µm));
ML=Radiance multiplicative scaling factor for the band; (RADIANCE_MULT_BAND_n from the metadata);
AL=Radiance additive scaling factor for the band; (RADIANCE_ADD_BAND_n from the metadata);
Q cal=Level 1 pixel value in DN.

At step 205, one or more spectral indices are automatically computed for each pixel of the satellite images using the corresponding spectral band specific reflectance values. In some examples, thematic layers or thematic maps representing the one or more spectral indices are automatically generated.

In some examples, the spectral indices for each pixel of the satellite images are automatically compared with respective pre-defined thresholds. Based on the comparison, each pixel is then automatically classified into one or more classes with respect to each of the spectral index. In some examples, thematic layers or thematic maps representing the one or more spectral indices and corresponding classification are automatically generated.

In some examples, thematic layers or thematic maps representing the one or more spectral indices and corresponding classification are automatically generated In some examples, the spectral index includes the normalized difference vegetation index (NDVI). For computing NDVI, the visible red and near-infrared (NIR) bands of the satellite images corresponding to the defined geographic area and the time frame are automatically retrieved from the one or more servers. The digital number of each pixel of the satellite image in the visible red band is converted into respective reflectance value of the visible red band. The digital number of each pixel of the satellite image in the NIR band is converted into respective reflectance value of the NIR band. The NDVI is computed for each pixel of the satellite images using the respective reflectance values of the visible red band and the NIR band.

$$NDVI=(NIR-RED)/(NIR+RED)$$

The computed NDVI values for each pixel of the satellite images are presented on an image of the geographic area. In some examples thematic layer or map representing the NDVI corresponding to the defined geographic area and the time frame are automatically generated.

Figure 2A:
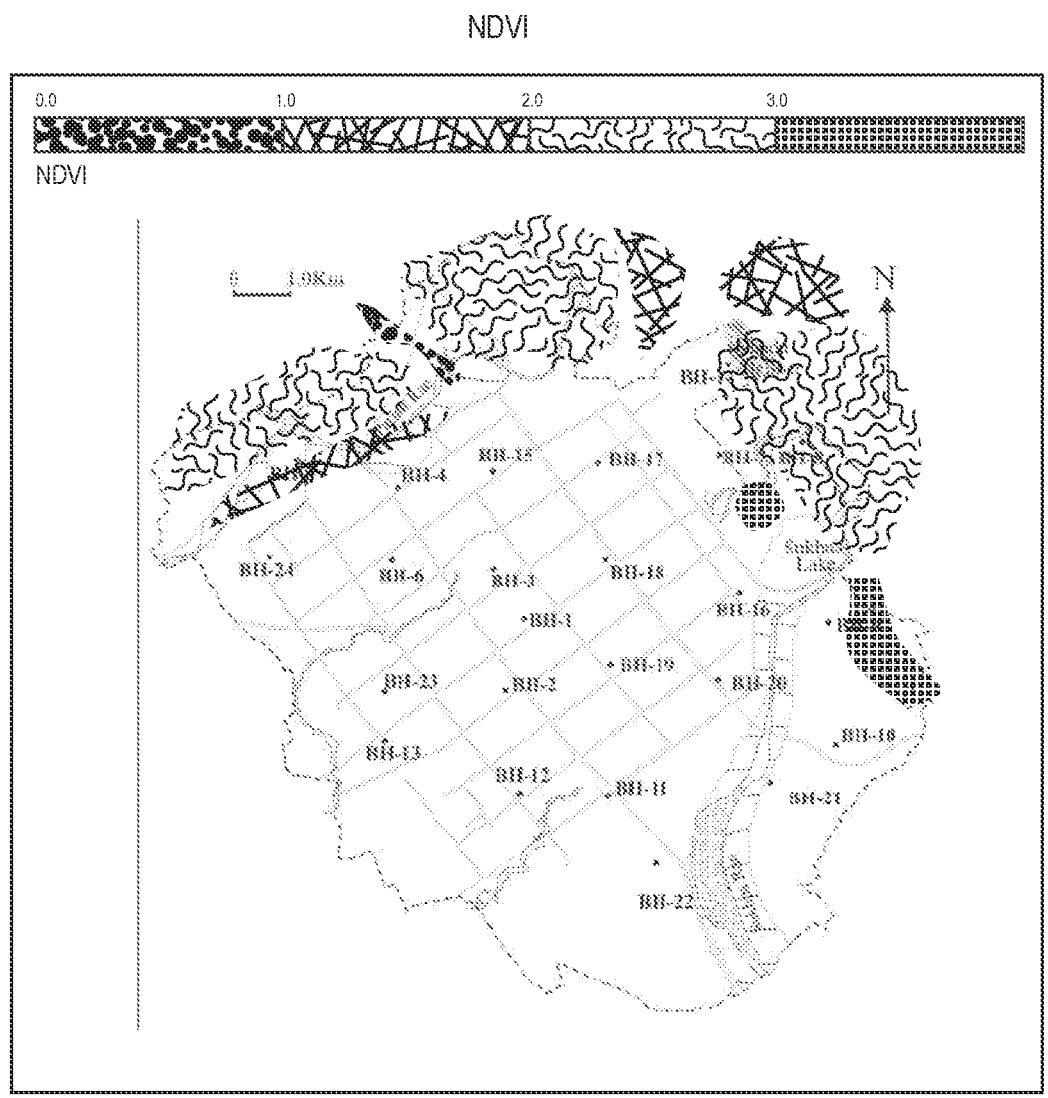
FIG. 2A shows the thematic layer or thematic map representing the NDVI.

As an example, FIG. 2A shows the thematic layer or thematic map representing the NDVI corresponding to the defined geographic area and the time frame.

In some examples, the spectral index includes the modified normalized difference water index (MNDWI). For computing MNDWI, the visible green and short wave infrared (SWIR) bands of the satellite images corresponding to the defined geographic area and the time frame are automatically retrieved from the one or more servers. The digital number of each pixel of the satellite image in the visible green band image is converted into reflectance value of the visible green band. The digital number of each pixel of the satellite image in the SWIR band image is converted into reflectance value of the SWIR band. The MNDWI is computed for each pixel of the satellite images using the respective reflectance values of the visible green band and the SWIR band.

$$MNDWI=(Green-SWIR)/(Green+SWIR)$$

The computed MNDWI values for each pixel of the satellite images are presented on an image of the geographic area. In some examples thematic layer or map representing the MNDWI corresponding to the defined geographic area and the time frame are automatically generated.

Figure 2B:
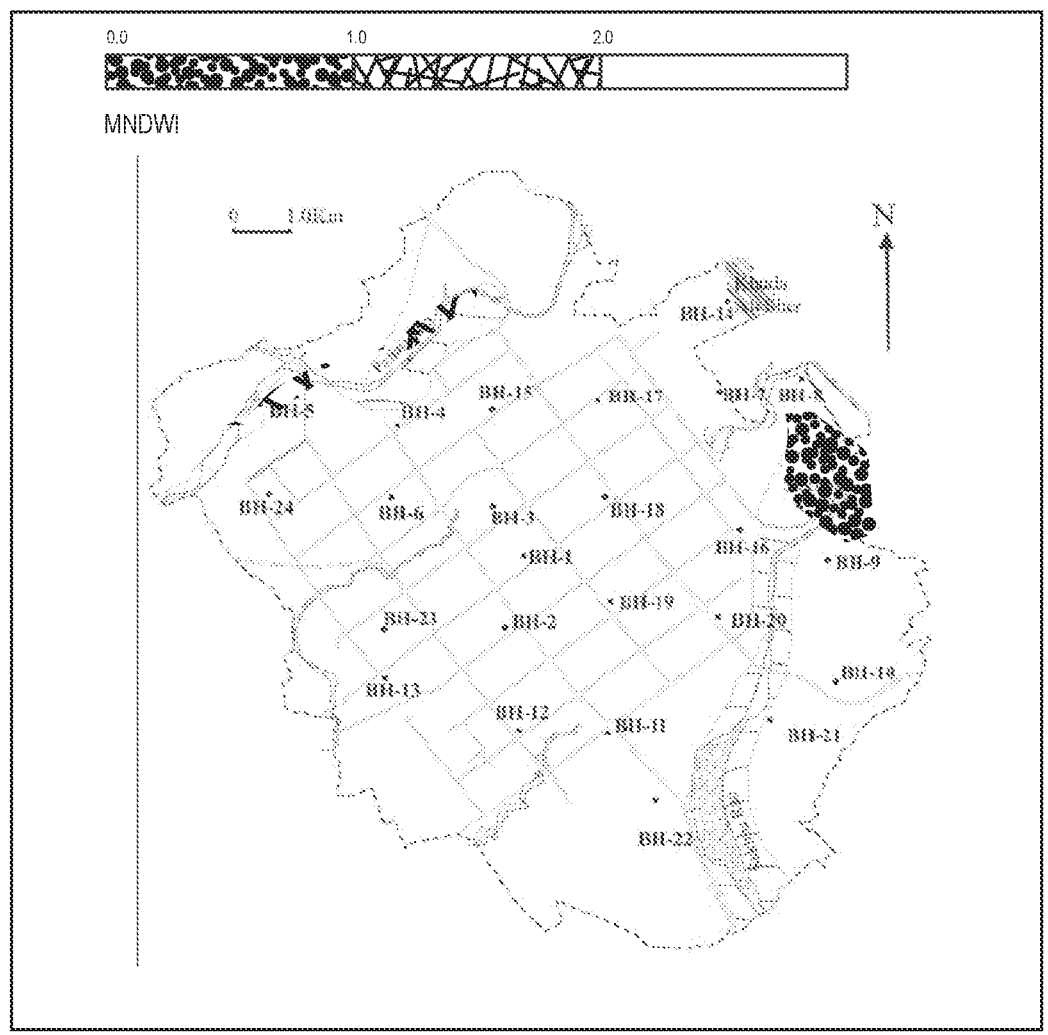
FIG. 2B shows the thematic layer or thematic map representing the MNDWI.

As an example, FIG. 2B shows the thematic layer or thematic map representing the MNDWI corresponding to the defined geographic area and the time frame.

In some examples, the spectral index includes the normalized difference built-up index (NDBI). In such a scenario, the near-infrared (NIR) and the short wave infrared (SWIR) bands of the satellite images corresponding to the defined geographic area and the time frame are automatically retrieved from the one or more servers. The digital number of each pixel of the satellite images in the NIR band is converted into reflectance value of the NIR band. The digital number of each pixel of the satellite image in the SWIR band is converted into reflectance value of the SWIR band. The NDBI is computed for each pixel of the satellite images using the respective reflectance values of the NIR and SWIR band.

$$NDBI=(SWIR-NIR)/(SWIR+NIR)$$

The computed NDBI values for each pixel of the satellite images are presented on an image of the geographic area. In some examples thematic layer or map representing the NDBI corresponding to the defined geographic area and the time frame are automatically generated.

In some examples, the spectral index includes the normalized difference moisture index (NDMI). For computing NDMI, the near-infrared (NIR) and the short wave infrared (SWIR) bands of the satellite images corresponding to the defined geographic area and the time frame are automatically retrieved from the one or more servers. The digital number of each pixel of the satellite images in the NIR band is converted into reflectance value of the NIR band. The digital number of each pixel of the satellite image in the SWIR band is converted into reflectance value of the SWIR band. The NDMI is computed for each pixel of the satellite images using the respective reflectance values of the NIR and SWIR band.

$$NDMI=(NIR-SWIR)/(NIR+SWIR)$$

The computed NDMI values for each pixel of the satellite images are presented on an image of the geographic area. In some examples thematic layer or map representing the NDMI corresponding to the defined geographic area and the time frame are automatically generated.

Figure 2C:
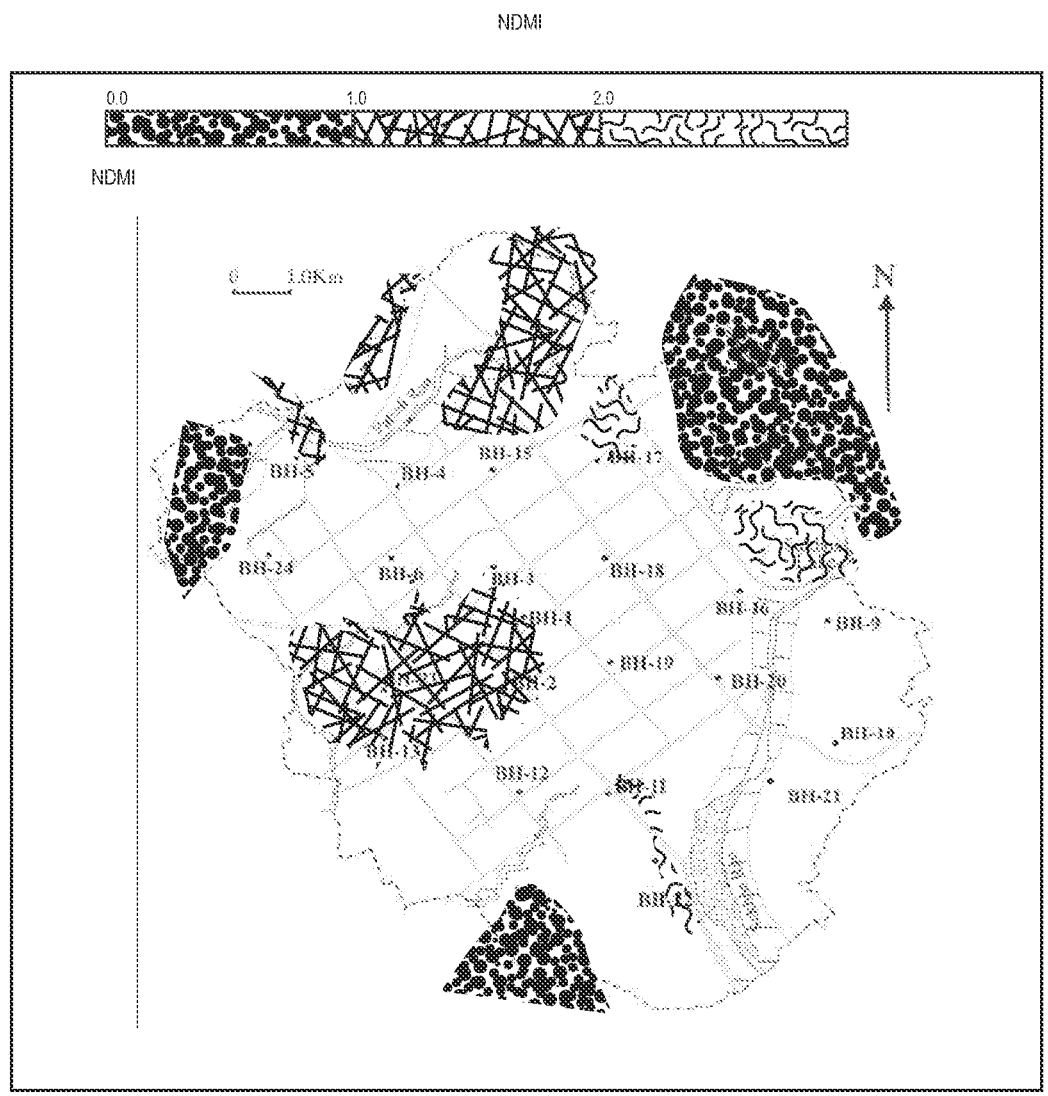
FIG. 2C shows the thematic layer or thematic map representing the NDMI.

As an example, FIG. 2C shows the thematic layer or thematic map representing the NDMI corresponding to the defined geographic area and the time frame.

It is to be understood to a person of ordinary skilled in the art that depiction of thematic layer or thematic map representing the NDVI, MNDWI, and NDMI is for the purpose of example only, and shall in no way be considered as limiting. Other spectral indices such as but not limited to NDBI are computed in the similar fashion and could be depicted similarly.

Figure 3:
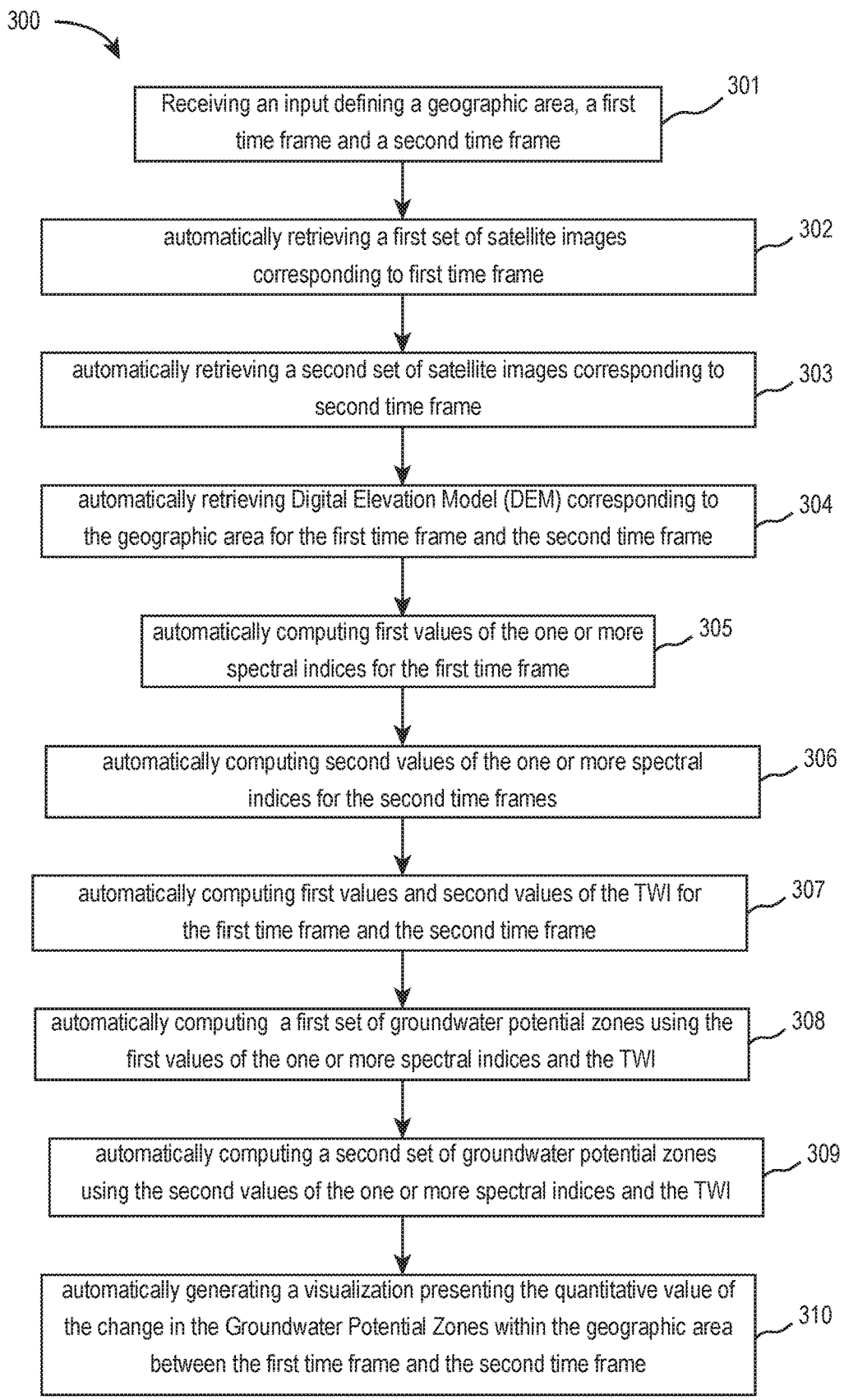
FIG. 3 schematically shows an exemplary flow diagram for detecting change in the groundwater potential zones within the geographic area over different time frames.

FIG. 3 schematically shows an exemplary flow diagram 300 for detecting change in groundwater potential zones over different time frames.

At step 301, a first input defining a geographic area and a first time frame and a second input defining a second time frame is received from the user. The inputs are intended towards change detection in groundwater potential zones between the first and the second time frame for the defined geographic area.

At step 302, a first set of satellite images corresponding to the defined geographic area and the first time frame are automatically selected and retrieved from the one or more servers.

At step 303, a second set of satellite images corresponding to the defined geographic area and the second time frame are automatically selected and retrieved from the one or more servers.

At step 304, Digital Elevation Model (DEM) corresponding to the geographic area for the first time frame and the second time frame is automatically retrieved from the one or more servers.

At step 305, first values of the one or more spectral indices are automatically computed using the first set of satellite images for the first time frame as described in detail in FIG. 2.

At step 306, second values of of the one or more spectral indices are automatically computed using the second set of satellite images for the second time frame as described in detail in FIG. 2.

At step 307, first values and second values of the TWI are automatically computed using the Digital Elevation Model (DEM) corresponding to the geographic area for the first time frame and the second time frame as described in detail in FIG. 1.

At step 308, a first set of groundwater potential zones using the first values of the one or more spectral indices and the TWI are automatically computed as described in detail in FIG. 1.

At step 309, a second set of groundwater potential zones using the second values of the one or more spectral indices and the TWI are automatically computed as described in detail in FIG. 1.

At step 310, a visualization presenting the quantitative value of the change in the ground water potential zones within the geographic area between the first time frame and the second time frame is automatically generated. In some examples, a change map representing the quantitative statistical measurements of the groundwater potential zones within the geographic area for first time frame and second time frame is automatically generated and presented on an image of the geographic area. In some examples, the change map shows the relative change in groundwater potential zones within the geographic area between the first time frame and the second time frame. In some examples, markers depicting an increase or decrease in the groundwater potential zones between the first time frame and the second time frame are also presented on an image or a map of the geographic area. In some examples, percentage change in area covered by each groundwater potential zone is generated and presented on an image or a map of the geographic area.

Figure 3A:
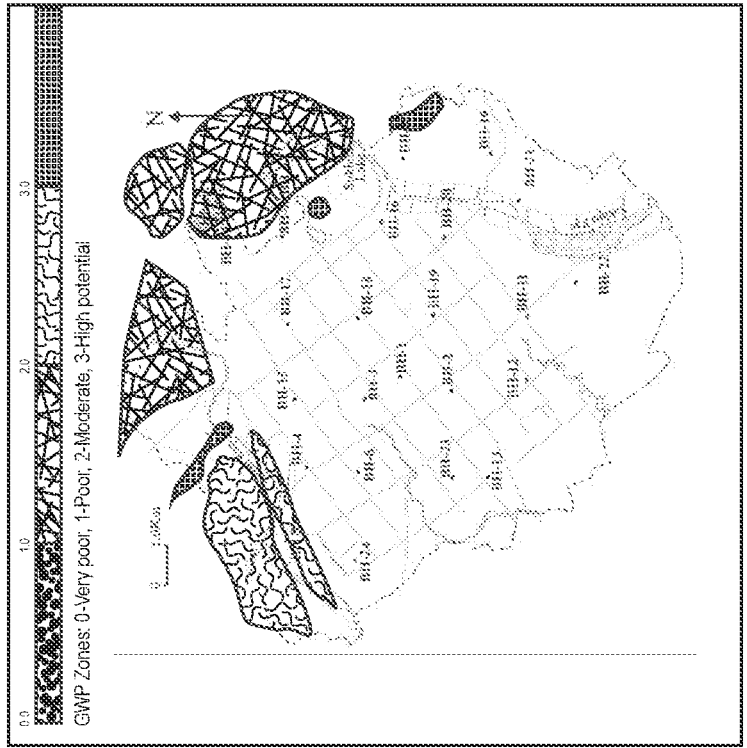
FIG. 3A shows the groundwater potential zones within the geographic area for the first time frame and the second time frame.
Figure 3A:
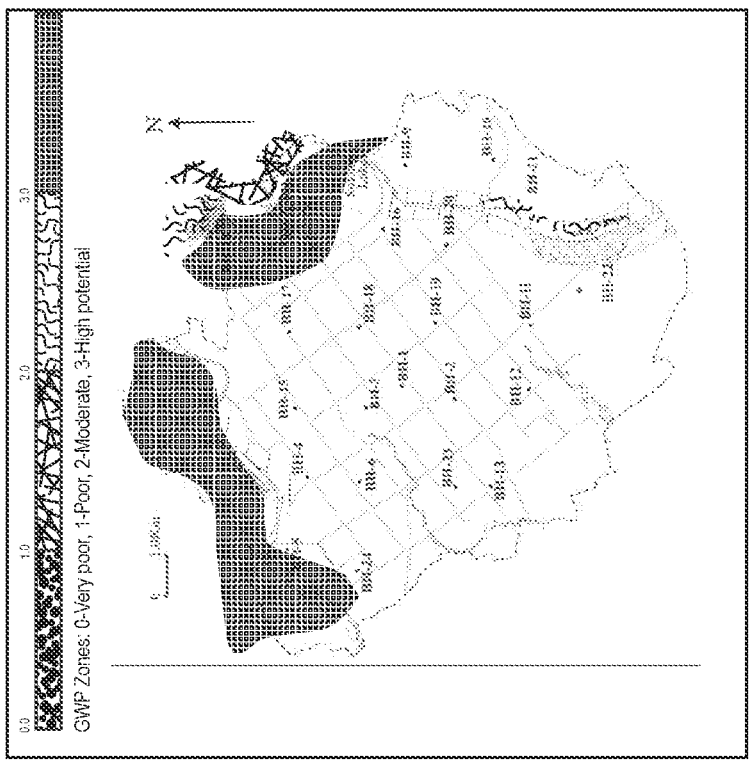
Figure 3B:
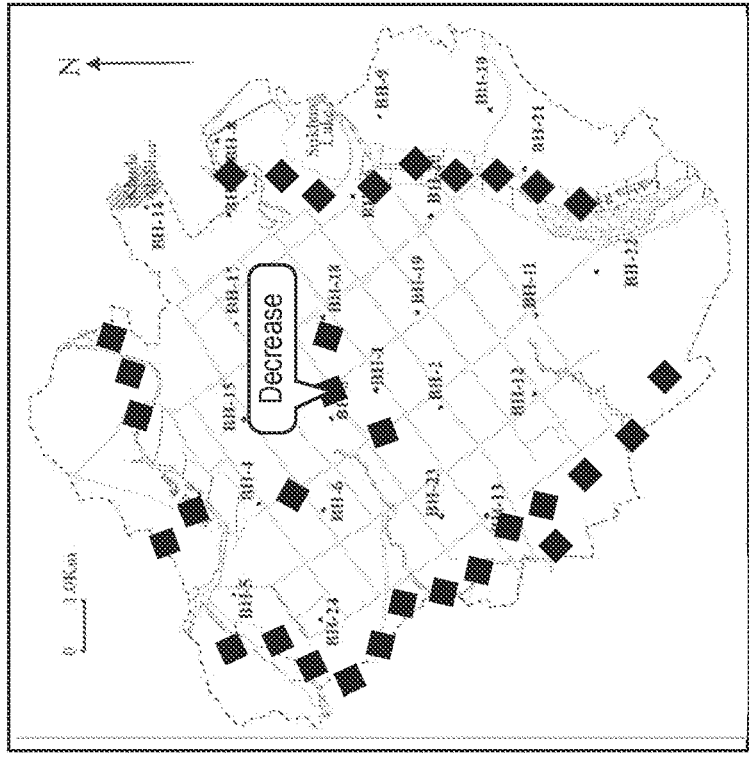
FIG. 3B shows the change map of the groundwater potential zones within the geographic area between the first time frame and second time frame.

As an example, FIG. 3A shows the groundwater potential zones within the geographic area for the first time frame and the second time frame. As an example, FIG. 3B shows the change map of the groundwater potential zones within the geographic area between the first time frame and second time frame.

One skilled in the art will appreciate that above described visualization presenting the quantitative value of the change in the groundwater potential zones within the geographic area between the first time frame and the second time frame has been described. A similar visualization presenting the quantitative value of the change in the groundwater potential zones within the geographic area for any number of time frames shall be considered within the spirit and scope of the present description.

One skilled in the art will appreciate that, for this and other methods disclosed herein, the functions performed in the methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
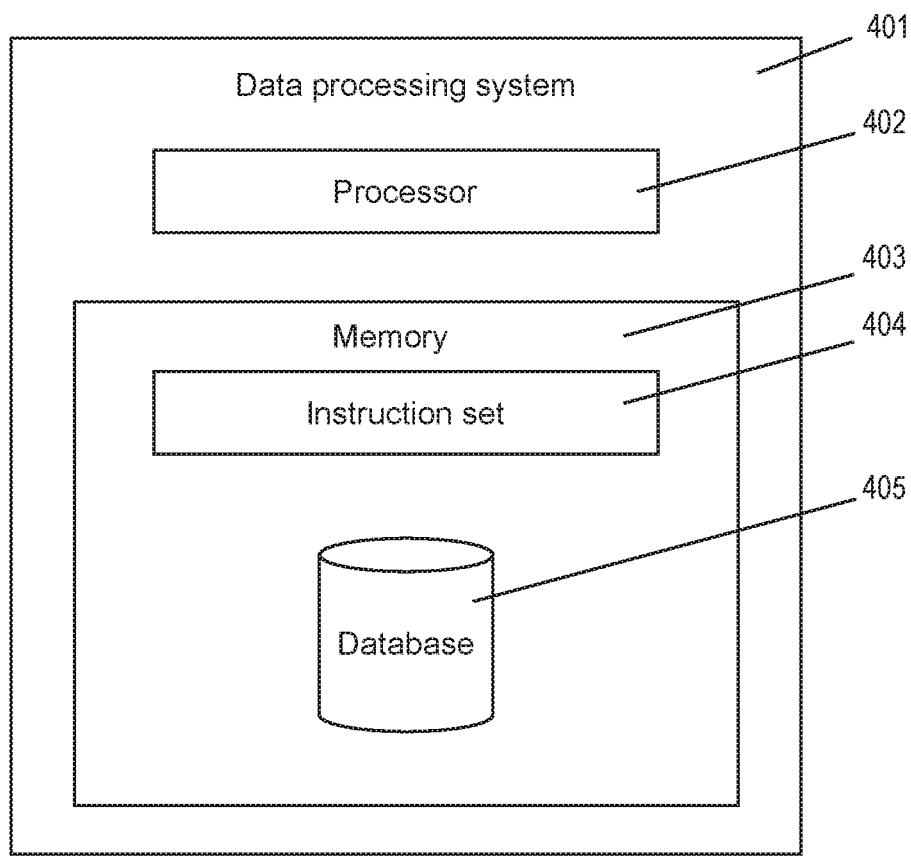
FIG. 4 schematically shows a block diagram of an illustrative example of a system for determining and presenting the groundwater potential zones within the geographic area.

FIG. 4 schematically shows a block diagram of an illustrative example of a system 400 for geospatial analysis for determining and presenting urban parameters and detecting a change in urban parameters between different time frames, arranged in accordance with at least some embodiments described herein. As depicted in FIG. 4, the system 400 includes a data processing system 401, which comprises at least one processor 402 and at least one memory 403. The memory 403 comprises an instruction set storage 404 and a database 405. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof. The system components may be provided by one or more server computers and associated components.

In some examples, the data processing system 401, with use of the processor 402, may be configured, based on execution of one or more instructions stored on the instruction set storage 404 and/or database 405, to perform some or all the operations of the methods 100, 200, and/or 300 as detailed above.

It is to be noted herein that various aspects and objects of the present invention described above as methods and processes should be understood to an ordinary skilled in the art as being implemented using a system that includes a computer that has a CPU, display, memory and input devices such as a keyboard and mouse. According to an embodiment, the system is implemented as computer readable and executable instructions stored on a computer readable media for execution by a general or special purpose processor. The system may also include associated hardware and/or software components to carry out the above described method functions. The system is preferably connected to an internet connection to receive and transmit data.

The term "computer-readable media" as used herein refers to any medium that provides or participates in providing instructions to the processor of the computer (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Although the present invention has been described in terms of certain preferred embodiments, various features of separate embodiments can be combined to form additional embodiments not expressly described. Moreover, other embodiments apparent to those of ordinary skill in the art after reading this disclosure are also within the scope of this invention. Furthermore, not all of the features, aspects and advantages are necessarily required to practice the present invention. Thus, while the above detailed description has shown, described, and pointed out novel features of the invention as applied to various embodiments, it will be understood that various omissions, substitutions, and changes in the form and details of the apparatus or process illustrated may be made by those of ordinary skill in the technology without departing from the spirit of the invention. The inventions may be embodied in other specific forms not explicitly described herein. The embodiments described above are to be considered in all respects as illustrative only and not restrictive in any manner Thus, scope of the invention is indicated by the following claims rather than by the above description.

What is claimed is:

1. A computer-implemented method for determining groundwater potential zones within a geographic area, said method comprising:
   receiving an input defining a geographic area and a time frame;
   automatically retrieving a set of satellite images corresponding to the geographic area and the time frame;
   automatically retrieving Digital Elevation Model (DEM) corresponding to the geographic area and the time frame;
   automatically processing the set of satellite images to compute one or more spectral indices corresponding to the geographic area and the time frame;
   automatically processing the Digital Elevation Model (DEM) to compute topographic wetness index (TWI) corresponding to the geographic area and the time frame;
   automatically computing groundwater potential zones using the one or more spectral indices and the TWI; and
   automatically presenting a visualization depicting the groundwater potential zones within the geographic area for the time frame.

2. The computer-implemented method of claim 1, wherein said automatically retrieving a set of satellite images includes automatically selecting and retrieving satellite images with at most 5 percent cloud coverage from one or more servers.

3. The computer-implemented method of claim 1, wherein said automatically retrieving a set of satellite images includes automatically retrieving level-1 precision and terrain (L1TP) corrected satellite images from one or more servers.

4. The computer-implemented method of claim 1, wherein said automatically processing the satellite images to compute one or more spectral indices includes:
   automatically converting digital numbers of each pixel of one or more spectral band images, corresponding to the set of satellite images, into reflectance values of the respective spectral bands using radiometric calibration; and
   automatically computing one or more spectral indices for each pixel of the set of satellite images using the corresponding reflectance values.

5. The computer-implemented method of claim 4, wherein said automatically retrieving a set of satellite images includes automatically retrieving said one or more spectral bands or images corresponding to the one or more spectral indices.

6. The computer-implemented method of claim 4, wherein said automatically processing the satellite images to compute one or more spectral indices includes automatically fetching said one or more spectral band images, corresponding to the one or more spectral indices, from the set of satellite images.

7. The computer-implemented method of claim 1, wherein the one or more spectral indices include at least one of normalized difference vegetation index (NDVI), modified normalized difference water index (MNDWI), normalized difference built up index (NDBI), and normalized difference moisture index (NDMI).

8. The computer-implemented method of claim 1, wherein said automatically processing the Digital Elevation Model (DEM) to compute a topographic wetness index (TWI) includes:
   automatically computing slope, using the DEM, corresponding to the geographic area and the time frame; and
   automatically computing TWI using the slope corresponding to the geographic area and the time frame.

9. The computer-implemented method of claim 1, wherein said automatically computing the groundwater potential zones using the one or more spectral indices and the TWI includes:
   automatically computing and assigning weights to each of the one or more spectral indices and the TWI; and
   automatically determining a groundwater potential index for each pixel of the set of satellite images using the weighted one or more spectral indices and the TWI via weighted sum approach;
   automatically comparing the groundwater potential index for each pixel of the set of satellite images with pre-defined thresholds; and
   automatically classifying each pixel of the set of satellite images, into zones including no GWP zones, poor GWP zones, moderate GWP zones, or high potential GWP zones, based on the comparison;
   wherein said automatically presenting a visualization depicting the groundwater potential zones includes automatically presenting the classified pixels, and respective classification, on an image of the geographic area.

10. The computer-implemented method of claim 9, wherein the computer-implemented method further comprises automatically calculating a quantitative value of an area covered by pixels of each class, and said automatically presenting a visualization depicting the groundwater potential zones includes automatically presenting the area covered by the pixels of each class on an image of the geographic area.

11. A system for determining groundwater potential zones within a geographic area, said system comprising:
   at least one processor;
   a memory that is coupled to the at least one processor and that includes computer-executable instructions, wherein the at least one processor, based on execution of the computer-executable instructions, is configured to:
receive an input defining a geographic area and a time frame;
retrieve a set of satellite images corresponding to the geographic area and the time frame;
retrieve Digital Elevation Model (DEM) corresponding to the geographic area and the time frame;
process the set of satellite images to compute one or more spectral indices corresponding to the geographic area and the time frame;
process the Digital Elevation Model (DEM) to compute a topographic wetness index (TWI) corresponding to the geographic area and the time frame;
compute groundwater potential zones using the one or more spectral indices and the TWI; and
present a visualization depicting the groundwater potential zones within the geographic area for the time frame.

12. The system of claim 11, wherein the at least one processor being configured to retrieve a set of satellite images includes the at least one processor being configured to select and retrieve satellite images with at most 5 percent cloud coverage from one or more servers.

13. The system of claim 11, wherein the at least one processor being configured to retrieve a set of satellite images includes the at least one processor being configured to retrieve level-1 precision and terrain (L1TP) corrected satellite images from one or more servers.

14. The system of claim 11, wherein the at least one processor being configured to process the satellite images to compute one or more spectral indices includes the at least one processor being configured to:
convert digital numbers of each pixel of one or more spectral band images, corresponding to the set of satellite images, into reflectance values of the respective spectral bands using radiometric calibration; and
compute one or more spectral indices for each pixel of the set of satellite images using the corresponding reflectance values.

15. The system of claim 14, wherein the at least one processor being configured to retrieve a set of satellite images includes the at least one processor being configured to retrieve said one or more spectral bands or images corresponding to the one or more spectral indices.

16. The system of claim 14, wherein the at least one processor being configured to process the satellite images to compute one or more spectral indices includes the at least one processor being configured to fetch said one or more spectral band images, corresponding to the one or more spectral indices, from the set of satellite images.

17. The system of claim 11, wherein the one or more spectral indices include at least one of normalized difference vegetation index (NDVI), modified normalized difference water index (MNDWI), normalized difference built up index (NDBI), and normalized difference moisture index (NDMI).

18. The system of claim 11, wherein the at least one processor being configured to process the Digital Elevation Model (DEM) to compute a topographic wetness index (TWI) includes the at least one processor being configured to:
compute slope, using the DEM, corresponding to the geographic area and the time frame; and
compute TWI using the slope corresponding to the geographic area and the time frame.

19. The system of claim 11, wherein the at least one processor being configured to compute the groundwater potential zones using the one or more spectral indices and the TWI includes the at least one processor being configured to:
compute and assign weights to each of the one or more spectral indices and the TWI; and
determine a groundwater potential index for each pixel of the set of satellite images using the weighted one or more spectral indices and the TWI via weighted sum approach;
compare the groundwater potential index for each pixel of the set of satellite images with pre-defined thresholds; and
classify each pixel of the set of satellite images, into zones including no GWP zones, poor GWP zones, moderate GWP zones, or high potential GWP zones, based on the comparison;
wherein the at least one processor being configured to present a visualization depicting the groundwater potential zones includes the at least one processor being configured to present the classified pixels, and respective classification, on an image of the geographic area.

20. The system of claim 19, wherein the at least one processor is further configured to calculate a quantitative value of an area covered by pixels of each class, and the at least one processor being configured to present a visualization depicting the groundwater potential zones includes the at least one processor being configured to present the area covered by the pixels of each class on an image of the geographic area.

21. A non-transitory computer-readable medium that comprises computer-executable instructions that, based on execution by at least one processor of a computing device that includes memory, cause the computing device to perform one or more steps of the method of claim 1.

* * * * *